United States Patent

Gessner et al.

[11] Patent Number: 5,158,428
[45] Date of Patent: Oct. 27, 1992

[54] SHOELACE SECURING SYSTEM

[76] Inventors: Gerhard E. Gessner, P.O. Box 2182, La Jolla, Calif. 92038; Jeremiah S. Sullivan, P.O. Box 7870, San Diego, Calif. 92167

[21] Appl. No.: 670,587

[22] Filed: Mar. 18, 1991

[51] Int. Cl.⁵ .............................................. F16G 11/00
[52] U.S. Cl. ................................. 24/712.9; 24/712.1; 24/714.6
[58] Field of Search ................. 24/712.9, 712.1, 712.2, 24/713.2, 714.6

[56] References Cited

U.S. PATENT DOCUMENTS

| | | |
|---|---|---|
| 400,812 | 4/1889 | Wilson, Jr. ........................... 24/712.9 |
| 670,353 | 3/1901 | Abell .................................... 24/712.9 |
| 819,884 | 5/1906 | Higgins ................................ 24/712.2 |
| 1,048,051 | 12/1912 | De Lany ............................... 24/712.9 |
| 1,094,262 | 4/1914 | Spangenberg ....................... 24/712.9 |
| 1,696,790 | 12/1928 | Bongiovanni ....................... 24/712.2 |
| 2,038,851 | 4/1936 | Nagamatsu .......................... 24/712.9 |
| 3,574,900 | 4/1971 | Emery . | |
| 4,361,938 | 12/1982 | Emery . | |
| 4,514,882 | 5/1985 | Lavielle ............................... 24/712.1 |
| 4,949,437 | 8/1990 | Anderson ............................ 24/712.2 |

FOREIGN PATENT DOCUMENTS

| | | | |
|---|---|---|---|
| 0365414 | 12/1922 | Fed. Rep. of Germany ..... | 24/714.6 |
| 058406 | 3/1925 | Sweden ............................... | 24/712.1 |

Primary Examiner—Victor N. Sakran
Attorney, Agent, or Firm—Brown, Martin, Haller & McClain

[57] ABSTRACT

A shoelace retaining system for securing individual free ends of shoelaces after the shoelaces have been tightened on the shoe, with a quick and easy engagable and disengageable retaining means. The shoelace retaining means has an open slot on one side that allows insertion of the shoelace along its length into the retaining portion, for tightening of the shoelace by pulling the shoelace relative to the retaining device in one direction. Easy release of the shoelace is accomplished by merely pulling the shoelace outwardly through the slot and away from the retaining portions.

24 Claims, 3 Drawing Sheets

SHOELACE SECURING SYSTEM

BACKGROUND OF THE INVENTION

Known shoes use shoelaces that pass through or are threaded through eyelets. The shoelaces are then pulled through the eyelets, tightening the opening of the shoe over the tongue of the shoe with the free ends of the laces being tied. This allows flexible adjustment of the shoe along with securing the shoe to the wearer's foot. All of this is well known and accepted. Yet as is often the case, the shoelaces can become untied often at inopportune times. Also there is some dexterity required in tieing shoelaces which is oftentimes difficult for some people to accomplish, the free end of the shoelaces are often excessively long causing the tied ends to flop around, and in some cases the very time it takes to tie shoelaces is something that the wearers of the shoes would like to eliminate.

Accordingly there have been devices used in the past which essentially involve passing both of the free ends of the shoelaces through a hole in a spring biased retainer device that clamps the shoelaces together. This device tends to resist the shoelaces being pulled back through the hole or opening without physically actuating a release of the spring biased clamp. While these devices have some advantages, they also have the disadvantages of requiring that the shoelaces be joined and passed through the retaining hole, the device does not provide a means for holding the shoelace ends while the shoelace is being tightened through the eyelets, and the device normally has to fit on the shoelaces in a position as close as possible to the point where the shoelaces exit the last eyelet to provide any retained tightening of the shoelaces. These devices have to be specifically released by some type of mechanical actuation of the device. So the free ends of the shoelaces cannot be released by merely grasping and moving the shoelaces. Further, since these devices are so close to the eyelets, they leave the free end of the shoelaces with such a long length that the shoelaces oftentimes reach the ground and can be stepped on by the wearer's other shoe the same as if the shoelaces had become untied. In addition to all the other disadvantages, the moving parts of the mechanical device are subject to being in use, broke, it does not lend itself to be attached or secured to the shoe, and also its retention force is often insufficient in a reasonably priced device to retain the shoelaces against sliding through the retention device.

So the need for a new and improved device or system for releasably securing the free end of shoelaces has wide application both to invalids, small children, and particularly to users of athletic shoes. Runners oftentimes need to tie their shoes quickly and securely without having the free ends of the lacings dragging the ground where they can be stepped on, and which can be tightened sufficiently to secure the shoe to the user's foot and have laces that, while not tied, and can be quickly released by merely grasping and maneuvering the free ends of the shoelaces.

It is therefore an advantage to have a new and improved shoelace retaining system that allows quick and easy insertion of the shoelace along its length to be inserted in or quickly removed from the shoelace retention device, which device automatically grasps and holds the shoelace against lengthwise pulling and movement, which only restrains the shoelace in one direction allowing the shoelace to be pulled and tightened through use of the shoelace retaining means, and which may be positioned anywhere on the shoe; thus reducing the length of the free end of the shoelaces so that they don't flop around after the shoelaces have been tightened.

It is therefore an object of this invention to provide a new and improved shoelace retaining means for securing the free end of a shoelace at a point away from the eyelet or hooks, which allows quick and easy connect and disconnect of the shoelace, and which retains the shoelace from being shifted lengthwise or pulled lengthwise in one direction but not in the other direction.

It is another object of this invention to provide a new and improved shoelace retaining system for connecting one end of a single shoelace to an eyelet adjacent the toe of the shoe, which shoelace is cross threaded through the eyelets to provide a single free end to be pulled in tightening the shoelace in the shoe, and then to secure the single end of the shoelace by a quick and easy positive retaining means.

It is another object of this invention to provide a quick and easily operated clip for gripping the end of a shoelace to permit an excess portion of the free end of a shoelace to be severed, and to restrain the shoelace from fraying.

It is another object of this invention to provide a new and improved system for securing the free end of shoelaces in a manner that the end of the shoelace may be secured at several different places or locations on the side of the shoe, and which retaining means are secured to the shoe either during construction of the shoe or at a later date.

It is another object of this invention to provide a new and improved system utilizing a new and improved shoelace retaining devices, to provide selective and individual tightening of shoelaces, at separate locations along the length of the opening of the shoe, which adjustable tightening may be selectively applied in different amounts, and separately controlled.

Other objects and many advantages of this invention will become more apparent upon a reading of the following detailed description and an examination of the drawings wherein like reference numerous designate like parts and in which:

BRIEF DESCRIPTION OF THE DRAWINGS

FIG. 9 is a side elevation view of a clamp with flanges for securement stitching or the like;

DETAILED DESCRIPTION OF THE PREFERRED EMBODIMENT(S)

Figure 1:
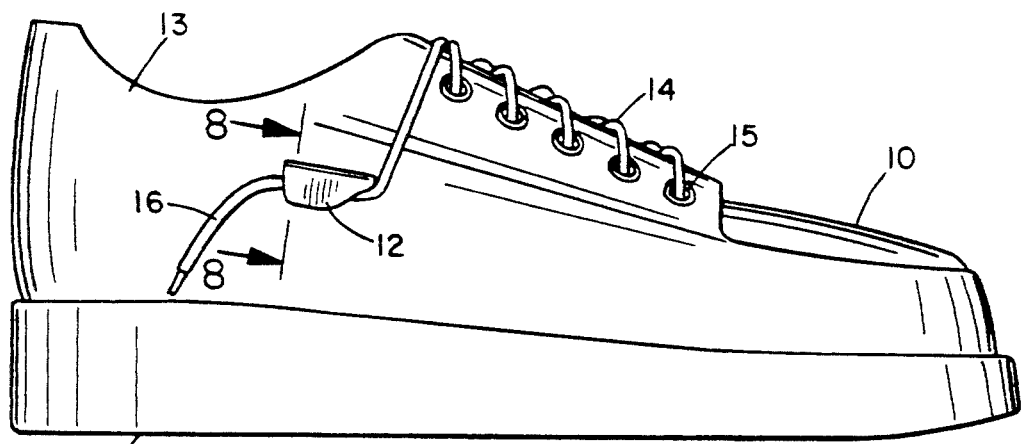
FIG. 1 is a side elevation view of a typical shoe with a lace clamp attached.

Referring now to FIG. 1, there is illustrated a normal shoe constructed along the lines of a running shoe. The shoe 10 has a sole 11 and an upper body 13 with eyelets 15 through which a normal shoestring or shoelace 14 is threaded. The shoelace 14 accomplishes the function of closing the upper opening of the shoe in a manner that uniformly adjusts the closed opening to the shape of the wearer's foot. The laces 14 are normally tightened by pulling on free ends 16 in the normal manner. Without applicant's invention, the shoelace 16 would be tied in the normal manner. With applicant's invention, however, the free ends 16 of the shoelaces 14 are not tied, but rather are crisscrossed with the ends releasably retained and secured by the shoelace retaining means 12, which will be described in more detail hereinafter.

Figure 2:
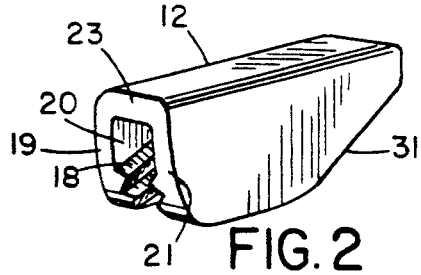
FIG. 2 is a perspective view of the clamp element.
Figure 3:
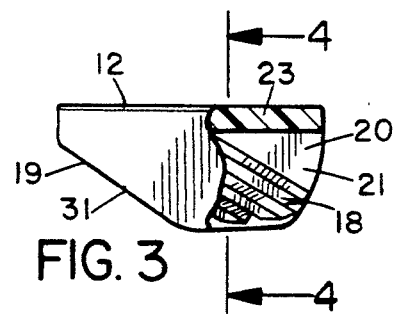
FIG. 3 is a side elevation view of the clamp, partially cut away to show internal ribs.
Figure 4:
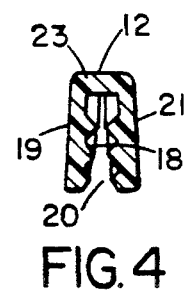
FIG. 4 is a sectional view taken on line 4—4 of FIG. 3.
Figure 13:
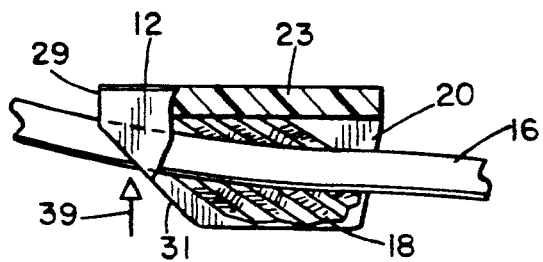
FIG. 13 is a partial sectional view of the clamp of FIG. 2 through 4, illustrating the shoelace 16 passing there through in the position.

Referring to FIG. 2, the shoelace retaining means or clamp 12 comprises a u-shaped member with sidewalls 19 and 21 joined by the center portion 23 forming a slot, see FIGS. 2, 3 and 4. The sidewalls 19 and 21 taper downwardly and outwardly providing an open-slotted volume 20. The adjacent inner surfaces of the sidewalls 19 and 21 have respective angled grooved projections 18. The clamp 12 has an open channel that extends therethrough from each open end through the clamp 12. The grooved surfaces extend also along the length of the channel and are angled inwardly. Accordingly, the shoelace enters the channel volume 20 at the left end of the clamp, see FIGS. 3 and 13. The force of the pulling tension on to the end 16 of the shoelace forces the shoelace into the narrowing opening 20 slightly spreading the respective sides 19 and 21 apart, positioning the lace 16 on the grooves and in the slot 20 as illustrated in FIG. 13. It may thus be observed that any pulling on the line 16 to the right of FIG. 13 will tend to pull the lace 16 further through the clamp 12 in the channel 20. However, any pulling force exerted lengthwise on the shoelace 16 in the direction to the left of FIG. 13, will cause the shoelace 16 to be moved by the grooves 18 in a direction of arrow 39, toward the center 23 of clamp 12, further locking and retaining the shoelace 16 in the channel volume 20.

When the shoelace 16 is to be released, the shoelace 16 is pulled downwardly, see FIG. 13, thus moving the shoelace out of the channel volume 20 into the released and non-retained position, separate from the clamp 12. Accordingly it may be understood with reference to FIG. 12, that the shoelace 16 may be grasped on its free end, pulled down over the clamp 12 so that the mid portion of the shoelace 16 is adjacent the opening of the channel volume 20. The shoelace 16 end is then pulled upwardly, pulling the shoelace into the volume 20 and thus retaining the shoelace position lengthwise by the grooves 18 relative to the lengthwise pulling force on the free end of the lace 16, which force or tension results from maintaining the closed, laced condition of the shoe 10. Again when it's desired to release the free end of the shoelace 16, the free end is pulled downwardly pulling the shoelace out of the channel opening 20. The shoelace 16 is then free to be pulled through the eyelets 15 to the extent necessary to open up the shoe so that it may be removed from the user's foot.

Figure 5:
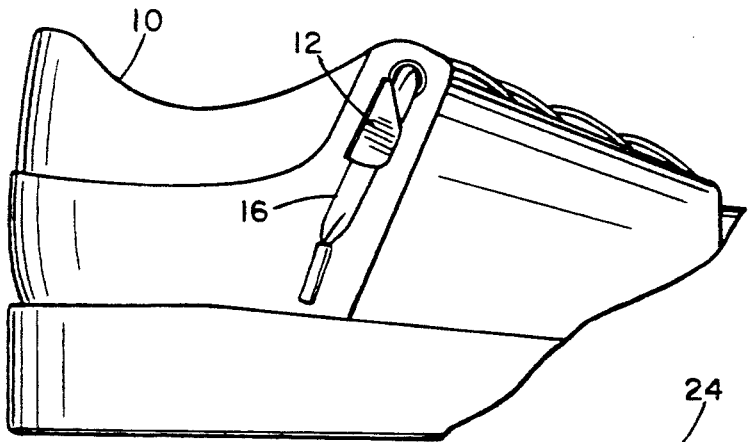
FIG. 5 is a side elevation view of a shoe illustrating an alternative clamp position.
Figure 6:
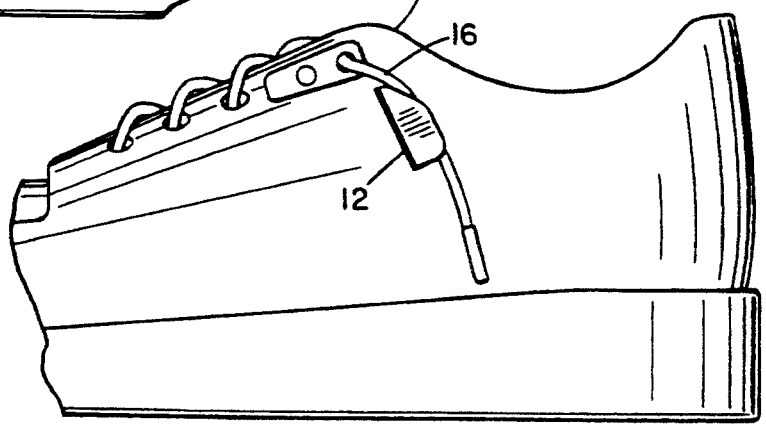
FIG. 6 is a similar view illustrating a further clamp position.

The configuration of the clamp, see FIGS. 2, 3 and 13 is such that the entrance end 29 of the clamp 12 is angled at side 31 to permit an easier and freer entry of the shoelace 16 into the channel 20. However, it can be recognized that the clamping force on line 16 is independent of the angular positioning of the clamp 12 relative to the directional, tensional pull on the shoelace 16. Accordingly, the clamp 12 may be positioned as illustrated in FIG. 1 at a slightly less than normal angle to the angular directional pull on the shoelace end 16, but with the opening opposite to the side from which the directional pull is exerted. In FIG. 5, the clamp 12 is positioned with the channel 20 aligned with the lengthwise tension pull on shoelace 16. In FIG. 6, the clamp 12 is in a reverse position where the channel opening 20 is slightly off axis with the direction of the lengthwise tension pull on the end 28 of the shoelace, but with the opening 20 being open toward the rear of the shoe.

Figure 7:
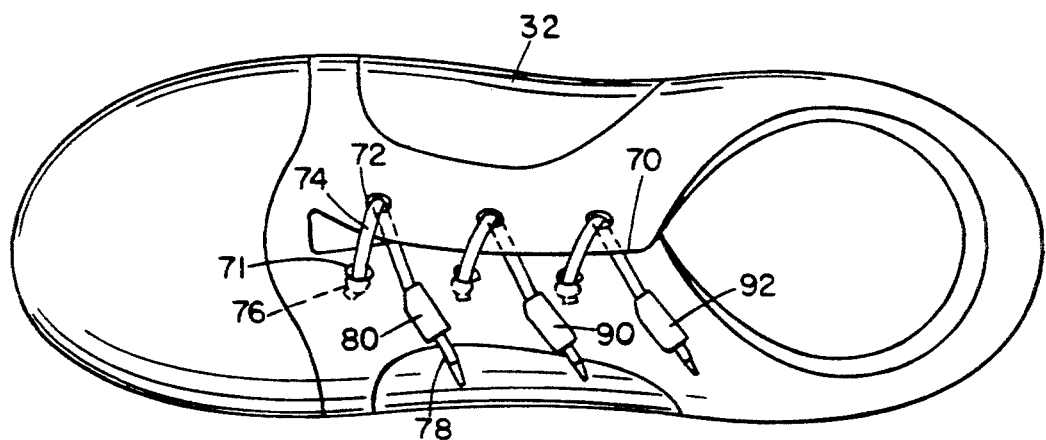
FIG. 7 is a side elevation view of a shoe with multiple clamps attached.

FIG. 7 illustrates a different embodiment where there are a plurality of separate shorter shoelaces, each of which are used to pass through only a pair of adjacent eyelets. The one end of the shoelace 76 is knotted and with the free end cross laced through the respective eyelets 71 and 72 to provide a short free end 78 that is pulled into the opening 20 and retained in position by clamp 80. Similarly, the same arrangement is used on the next pair of eyelets with the free end of the shoelace being held in clamp 90 and additionally, the next pair of eyelets are similarly used to separately close the opening 70 by a shoelace that is held in clamp 92. Accordingly, the shoe opening 70 of shoe 32 is closed and tightened by three separate shoelaces, each of which may be separately adjusted to apply a separate closing force on the opening of the shoe 70, commensurate with the configuration of the user's foot, or for other reasons, by merely separately adjusting the longitudinal position of the free ends of the respective shoelaces through each of the respective clamps 80, 90 and 92.

While the embodiment of FIG. 7 illustrates three separate sets of eyelets and three separate shoe strings, it may be understood that any combination may be used to achieve whatever tension and adjustment desired along the length of the opening 70 of the shoe 32. It may be further understood that each of the clamps 80, 90 and 92 allow adjustment of the tension and/or the lengthwise positioning of the free end of the respective shoelaces by merely grasping the free end, as for example free end 78, and pulling it through the longitudinal channel 20 of the clamp 80 to achieve the desired tension. If excess tensioning of the respective shoelace occurs, then the free end 78 of the shoelace may be pulled toward the opening 20 of clamp 80, freeing the respective shoelace end from the clamp 80. The shoelace 78 can then be reinserted into the opening of the channel 20 and again tension the desired and controlled amount.

Thus the embodiment in FIG. 7 allows separate and individual tensioning as well as closing of the respective openings 70 along the entire length of the opening 70. This further reduces the length of the free end of the laces, by allowing multiple tensioning through multiple shoelaces, rather than pulling the shoelaces to a tight position through all of the eyelets, see FIG. 1, to provide a tensioning of the shoelace through the entire length of the shoelace required to pass through all of the eyelets 15.

Figure 8:
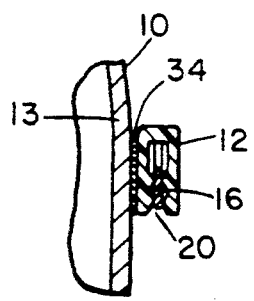
FIG. 8 is an enlarged sectional view taken on line 8—8 of FIG. 1.

Referring now to the FIGS. 8, 9, 10, 11 and 12, these figures illustrate modified designs of the configuration and shape of the clamp, and also the manner of securing the clamps to the shoes. Referring to FIG. 8, the clamp 12 may be secured to the side wall 13 of the shoe 10 by any suitable adhesive 34. FIG. 8 also shows the cross-section of the lace 16 when inserted in the channel volume 20 in FIG. 1.

Figure 9:
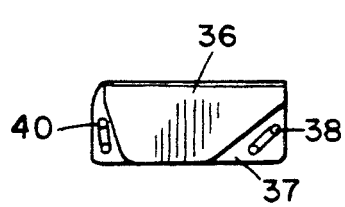
Figure 10:
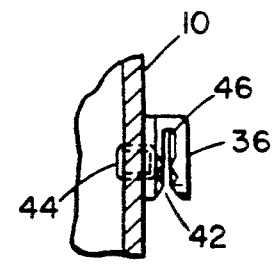
FIG. 10 is a a sectional view similar to FIG. 8, with the clamp stitching in place.
Figure 11:
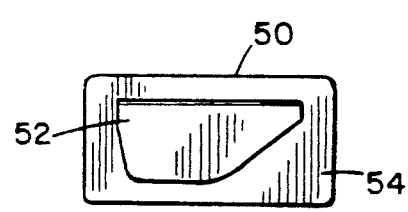
FIG. 11 is a side elevation view of a clamp with an alternative attachment plan.
Figure 12:
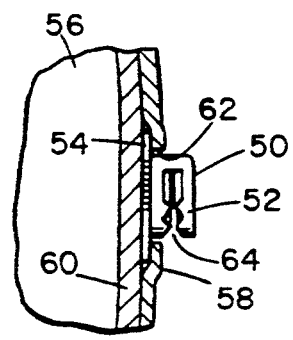
FIG. 12 is a sectional view showing the attachment of the clamp of Fi 11.

The clamp 36 in FIG. 9 has an enlarged side 37 corresponding to, for example, side 21 in FIG. 4. This area is used to position respective holes 38 and 40 that are used to secure the clamp 36 to the side wall 13 of the shoe 10 by sewing rivets or, the like. This sewing 44 is illustrated in FIG. 10. FIGS. 11 and 12 illustrate a clamp 52 that has an enlarged side 54 corresponding to side 21 in FIG. 4. FIG. 12 illustrates an aperture made through multiple layers of a modified side wall 56 of a shoe corresponding to shoe 10, with the aperture 62 receiving the flange portion 54 that fits into the undercut space. The clamp 50 may thus be held in this position by either the outer closing being resilient, or the layered materials may be glued or secured together by sewing, to enclose around the enlarged flange 54 to hold the clamp 50 in position.

Figure 14:
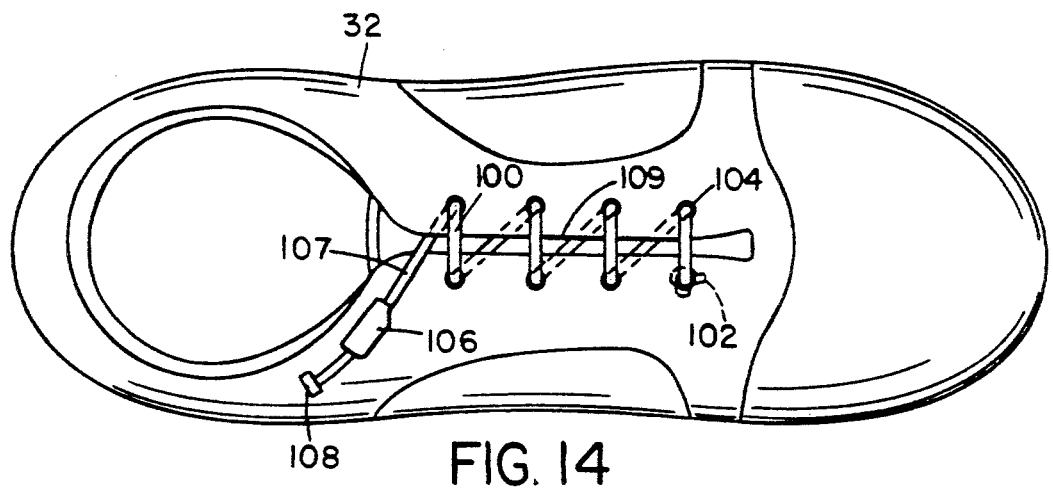
FIG. 14 is a top plan view of a shoe with an alternative single lace configuration.

The embodiment of FIG. 14 is still another use of the invention that permits a single shoelace to be cross threaded through eyelets 104. The one end of the shoelace 100 is knotted 102. This secures the one end of the shoelace to the position shown. The shoelace 100 is then cross threaded through the eyelets with its free end 107 being pulled on to tighten the shoelace through the eyelets 104. The free end 107 is then pulled through the clamp. This allows a single shoelace strand to be quickly and easily pulled, closing the opening 109 of the shoe 32 by the single strand, shoelace 100. In the embodiment in FIG. 14, the single strand shoelace 100 is threaded through each of the eyelets. However, it can be understood that the shoelace could pass through every other one of the eyelets, providing a new and easily tensioned single strand shoelace that is much easier to use, will tighten the opening of the shoe faster, and its single free end can be held and restrained by the single clamp 106. The free end 107 of the shoelace 100 is also cut off by use of the clip 108 in a manner that will be described hereinafter.

Figure 15:
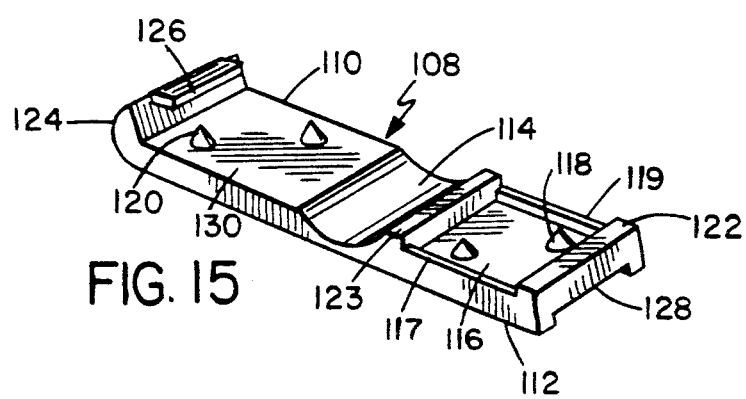
FIG. 15 is a perspective view of a lace end clip.
Figures 16, 17:
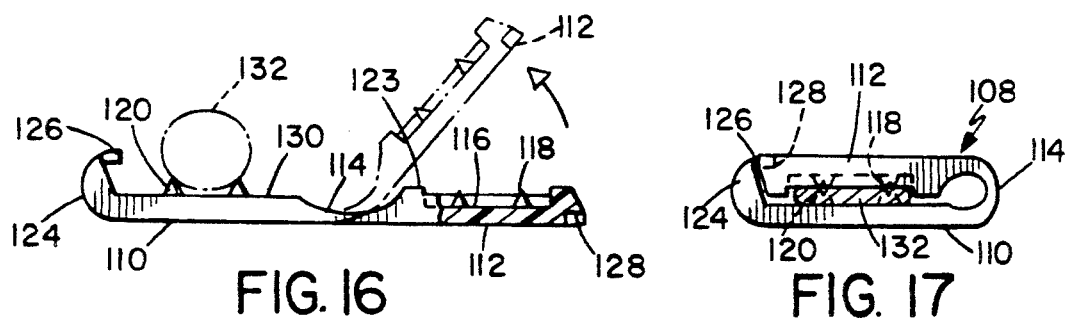
FIG. 16 is a side elevation view of the clip, partially cut away.
FIG. 17 is a side elevation view of the clip closed and locked on a lace.

FIGS. 15, 16 and 17 illustrate a clip 108 that is fastened to the free end of a shoe is to be shortened In the system of this invention, the shoelace is shortened to remove the excess length that would otherwise be required to tie the shoelaces. This invention employs a new and novel clip 108 that is snapped over the shoe string. The clip provides a side surface against which the end of the shoe string may be cut off, with the clip aiding the user in grasping the end of the shoe string, and also functioning to keep the shoe string from fraying.

Figure 18:
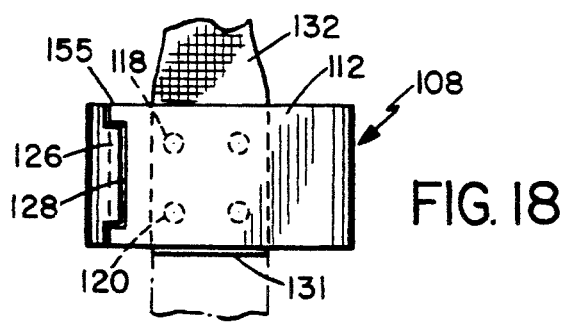
FIG. 18 is a top plan view of the clip showing the lace end cut off.

The clip 108 comprises a substantially rectangular member that may be made of any suitable material, such as plastic or the like. The rectangular shaped clip has two ends 110 and 112 that are separated by a grooved section 114. The thickness of material is such that the clip may be folded along the groove 14 with ends 110 and 112 pivoting together. In this position, a retainer clasp tongue 126 fits into and snaps over the recess portion 128 in end 112, holding the clip together in the manner illustrated in FIGS. 16 and 17. The end 110 has a curved shoulder 124 that carries the tongue 126. There is also a flat surface 130 having spikes 120. The other end 112 has a pair of upwardly projecting walls 122 and 123 with lower interconnecting sidewalls 117 and !119. The walls form a recess 116 having a flat surface from which spikes 118 project. When the two ends 110 and 112 are pivoted together as illustrated in FIG. 16, and a shoelace 132 is placed for example against the surface 130, this causes the shoelace 132 to be sandwiched between ends 110 and 112, to the point that the shoelace is squeezed therebetween and held by the respective members, which members are held together by the clasp 126–128. See FIGS. 17 and 18. This secures the shoelace between the respective surfaces, which is aided by being punctured and held in position by the opposed but offset spikes 118 and 120. The shoelace may then be severed along line 131, see FIG. 18, removing the excess shoelace. The shoelace is thus gripped by the clip 108 between the shoulders or walls 117 and 119 relative to the surface 130. The spacing between, for example wall 117 and 130, also provides an opening into which the blade end of a screwdriver may be inserted to snap the clip apart, if it is desired to remove the clip from the shoelace 132.

The clip 108 has outwardly projecting shoulders 155 that are grasped by the users fingers to pull the shoelace longitudinally.

From the description, it may be understood that this shoe lacing system uses slotted, jamming type clamps in any form or shape consistent with the invention, and which may be made from or molded from synthetic resin in any color, such as corresponding with the color of the shoelace or the color of the shoe. This clamping device can be attached to the shoe at any location and at any angle with the opening 20 facing down, up or at any desired configuration. Pulling the shoelace into the opening 20 where it is held in the opening 20 by the grooves 18, has the flexibility of allowing the pulling force on the shoelace 16 required to free the shoelace from the clamp, to be relative low.

The clamp can be attached to the shoe by stitching, sewn in the shoe, adhesive or cemented into position, or it may be made as a part of the shoe. While the clamping shoe system illustrates the clamp being positioned on the top right or left of the shoe, it can be placed anywhere on the shoe and can be placed at some distance from the last of the threaded eyelets, thus reducing the length of the free end of the shoelace extending out of the clamping device.

The shoelace retaining system retains the shoelace and allows the shoelace to perform its normal function of tightening the opening to the shoe, whether the shoelaces are laced through eyelets, or over hooks, or through different constructions of the shoelace openings. The shoelaces are inserted into the clamp or retaining means after tightening the shoe. However, it is easy to pull on the shoelace while in the clamped position, in the direction that the shoelace is not being retained, and the shoelace will further tighten the shoe. The shoelace is then quickly and easily unclamped by merely pulling the shoelace outwardly and away from the opening 20, immediately releasing the shoelace.

Having described our invention, we now claim:

1. A shoelace retaining means for securing the free end of a shoelace comprising,
   a shoe having a shoelace and shoelace receiving means, such as hooks or eyelets, with the shoelace when positioned in the receiving means having at least one free end,
   shoelace retaining means having a channel open at each end and on one side forming a slot that receives a shoelace in sideward longitudinal movements through the opening,
   means for securing the retaining means to the shoe,
   said shoelace retaining means comprising a foldable clip means forming a U-shaped member with a pair of side members with adjacent surfaces that form the channel,
   means on the adjacent surfaces that releasably retain said shoelace from lengthwise movement in one direction and allowing lengthwise movement of said shoelace in an opposite direction, and
   said retaining means having longitudinal grooves on the adjacent surfaces, which grooves are angled and shaped to receive and grasp the shoelace.

2. A shoelace retaining system as claimed in claim 1 wherein,
   said shoelace being pulled into one end of the shoe retaining means and exiting the other end,
   and a clip for being fastened to the shoelace portion exiting said other end at a location on said shoelace adjacent said other end.

3. A shoelace retaining system as claimed in claim 1 wherein,
   the free end of said shoelace being cut off adjacent the clip,
   and said clip enclosing an end portion of the shoelace.

4. A shoelace retaining system as claimed in claim 1 wherein,
   said clip having a generally rectangular with opposite ends foldable together around its midportion,
   and clasp means for holding said ends together with the shoelace positioned therebetween.

5. A shoelace retaining system as claimed in claim 1 wherein,
   spike means on the inner adjacent surfaces of said ends for piercing and holding the end of the shoelace.

6. A shoelace retaining system as claimed in claim 1 wherein,
   one of said adjacent surfaces having a recessed central surface with surrounding walls,
   and the walls that are normal to the folding axis being higher from the central surface than the two opposite walls, providing a space for receiving said shoelace and providing a shoulder which may be contacted to pry open said clip.

7. A shoelace retaining system as claimed in claim 1 wherein,
   said clip having shoulders that extend outwardly from the longitudinal length of said shoelace providing shoulders to be gripped in pulling the shoestring longitudinally.

8. A shoelace retaining system as claimed in claim 1 wherein,
   said shoe having a side wall,
   and said retaining means being fixed on said side wall adjacent one of said shoelace receiving means, through which the free end of the shoelace passes.

9. A shoelace retaining system as claimed in claim 1 wherein,
   said channel being positioned to point in the direction of said shoelace receiving means.

10. A shoelace retaining system as claimed in claim 1 wherein,
    said retaining means being positioned at an angle to the longitudinal length of the shoelace from said receiving means.

11. A shoelace retaining means for securing the free end of a shoelace comprising,
    a shoe having a shoelace and shoelace receiving means, such as hooks or eyelets, with the shoelace when positioned in the receiving means having at least one free end,
    shoelace retaining means having a channel open at each end and on one side forming a slot that receives the shoelace in sideward longitudinal movement through the opening,
    said shoelace retaining means comprising a foldable clip means forming a U-shape member having a pair of side members with adjacent surfaces that form the channel,
    said surfaces being tapered outwardly towards said opening and having angled grooves on their surfaces, for receiving and jamming the shoelace in movement of the shoelace in response to a pulling force along its length in only one direction,
    and means for securing the retaining means to the shoe.

12. A shoelace retaining system as claimed in claim 11 wherein,
    said shoelace being threaded through said receiving means with the free end of the shoelace projecting out of the last receiving means,
    said shoe having a side wall with the shoelace retaining means fixed to said side wall adjacent said last receiving means,
    and said channel being directed towards said last shoelace receiving means.

13. A shoelace retaining system as claimed in claim 11 wherein,
    said slot being open toward the front of the shoe.

14. A shoelace retaining system as claimed in claim 11 wherein,
    said slot being open toward the rear of the shoe.

15. A shoelace retaining system as claimed in claim 11 wherein,
    said channel being directed upwardly.

16. A shoelace retaining system for securing the free end of a shoelace comprising,
    a shoe having a longitudinal opening with a plurality of shoelace receiving means such as eyelets or hooks spaced along each side of the opening,
    a shoelace having one end secured to one of said receiving means adjacent one end of said opening with the free end of said shoelace being cross-threaded through ones of said receiving means along the length of said opening to the other end of said opening, whereby pulling the free end of said shoelace after threading through said receiving means, will move the sides of said opening,
    retaining means secured to said shoe for receiving and restraining the free end of the shoelace against lengthwise movement in only one direction,
    said shoelace retaining means comprising a foldable clip means forming a U-shaped member with adjacent sides forming a channel, said adjacent sides having internal grooves for receiving and grasping said shoelace, and one side edge of said sides being angled to facilitate receiving and grasping said shoelace that is pulled into said channel.

17. A shoelace retaining system as claimed in claim 16 wherein, said shoelace being insertable into said channel through said slot opening, by pulling on the shoelace lengthwise into said channel.

18. A shoelace retaining system as claimed in claim 16 wherein, one side of said U-shaped member being larger than the other side, forming a surface area on which are positioned means for securing the retaining means to the shoe.

19. A shoelace retaining means as claimed in claim 16 wherein, said shoelace retaining means being secured to said shoe by adhesive.

20. A shoelace retaining system as claimed in claim 16 wherein, said shoe having a wall comprising layers of material, a hole being recessed in the outer layer for receiving one side wall of said retaining means for securing said retaining means to said shoe.

21. A shoelace retaining system for securing the free ends of shoelaces comprising, a shoe having an opening with a plurality of shoelace receiving means such as eyelets or hooks spaced along each side of the opening, a plurality of separate shoelaces, each being individually secured at one end to one of said receiving means, with the other, free end being cross threaded through an individual group of said receiving means, a plurality of shoelace retaining means for being secured to said shoe and receiving and retaining the free ends of the shoelaces, each of said individual shoelaces being movable through said retaining means for tightening each individual shoelace through said individual group of retaining means, and each of said shoelaces and separate group of receiving means, and retaining means, being separate and spaced along the length of said opening, whereby each of said free ends of each of the shoelaces may be individually pulled through said retaining means, individually tightening the closing of said opening in the same or different amounts along the length of the opening.

22. A shoelace retaining means for securing the free ends of shoelaces as claimed in claim 18 wherein, each of said shoelace retaining means having a longitudinal channel for receiving and maintaining the free ends of the shoelaces against lengthwise movement in only one direction, said channel being open on one side forming a slot for receiving the free end of a shoelace at a point along the length of the shoelace, the retaining means in said channel being made operable by pulling said shoelaces into said channel through said open side, and each of aid shoelaces being removable from the corresponding retaining means by pulling the shoelace out of the slot.

23. A shoelace retaining system for securing the free ends of shoelaces comprising, a shoe having an opening with a plurality of shoelace receiving means such as eyelets or hooks spaced along each side of the opening, a plurality of separate shoelaces each being individually secured at one end of said receiving means with the free end being cross-threaded through a separate group of said receiving means, a plurality of shoelace retaining means having a longitudinal channel for receiving and retaining the free ends of the shoelaces against lengthwise movement in only one direction, said channel being open on one side forming a slot for receiving the free end of a shoelace at a point along the length of the shoelace, the retaining means in said channel being made operable by pulling said shoelace into said channel through said open side, and said shoelace being removed from said retaining means by pulling the shoelace out of the slot.

24. A shoelace retaining system for securing the free ends of shoelaces comprising, a shoe having a longitudinal opening with a plurality of eyelets spread along the length of the opening through which- shoelace are threaded, a plurality of shoelace retainer means, each having a channel open on one side forming a slot that receive the shoelace through the opening along the length of the shoelace, and grasps and secures the shoelace against lengthwise pulling force in one direction, a plurality of separate shoelaces, each of which have a free end, with the free end of each shoelace being secured to individual ones of said retainer means, and each of the free ends of each of said shoelaces being pulled into a respective retainer means and being tightened to provide individual and separate shoelace tightening of the opening in said shoe along the length of the opening.

* * * * *

UNITED STATES PATENT AND TRADEMARK OFFICE
CERTIFICATE OF CORRECTION

PATENT NO. : 5,158,428
DATED : October 27, 1992
INVENTOR(S) : Gerhardt E. Gessner, et al.

It is certified that error appears in the above-identified patent and that said Letters Patent is hereby corrected as shown below:

Column 7, claim 4, line 38 after "rectangular" insert --shape--

Signed and Sealed this

Thirtieth Day of November, 1993

Attest:

BRUCE LEHMAN

Attesting Officer

Commissioner of Patents and Trademarks